United States Patent
Inoue et al.

(10) Patent No.: US 11,115,304 B2
(45) Date of Patent: Sep. 7, 2021

(54) TRANSFER DEVICE AND FRAME TRANSFER METHOD

(71) Applicant: Mitsubishi Electric Corporation, Tokyo (JP)

(72) Inventors: Ayako Inoue, Tokyo (JP); Sachiko Taniguchi, Tokyo (JP); Yusuke Sakagami, Tokyo (JP); Ryusuke Kawate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 318 days.

(21) Appl. No.: 16/338,269

(22) PCT Filed: Oct. 26, 2016

(86) PCT No.: PCT/JP2016/081756
§ 371 (c)(1),
(2) Date: Mar. 29, 2019

(87) PCT Pub. No.: WO2018/078747
PCT Pub. Date: May 3, 2018

(65) Prior Publication Data
US 2019/0319865 A1  Oct. 17, 2019

(51) Int. Cl.
*H04L 12/28* (2006.01)
*H04L 12/26* (2006.01)
(Continued)

(52) U.S. Cl.
CPC ........ *H04L 43/0823* (2013.01); *H04L 1/0061* (2013.01); *H04L 1/245* (2013.01); *H04L 41/0677* (2013.01); *H04L 43/0811* (2013.01)

(58) Field of Classification Search
CPC ... H04L 43/0823; H04L 1/0061; H04L 1/245; H04L 41/0677; H04L 43/0811; H04L 1/0079; H04L 1/0045; H04L 12/28
See application file for complete search history.

(56) References Cited

U.S. PATENT DOCUMENTS 4,577,313 A * 3/1986 Sy .................. H04L 1/0083
370/403
8,196,021 B2 * 6/2012 Okabe ............ G06F 11/1008
714/776
(Continued)

FOREIGN PATENT DOCUMENTS

JP          4308297 B2    8/2009
WO      WO 2006/121014 A1   11/2006

OTHER PUBLICATIONS

LAN/MAN Standards Committee of the IEEE Computer Society, "Draft Standard for Ethernet Amendment: Specification and Management Parameters for Interspersing Express Traffic.", IEEE P802.3br™/D2.1, Jun. 10, 2015, pp. 1-53.
(Continued)

*Primary Examiner* — Edan Orgad
*Assistant Examiner* — Malick A Sohrab
(74) *Attorney, Agent, or Firm* — Birch, Stewart, Kolasch & Birch, LLP

(57) ABSTRACT

To include an FCS code calculation unit to calculate a first code that is an FCS code of a received frame, an FCS check unit to compare the first code with a second code that is an FCS code stored in the received frame, and to output a first comparison result indicating a match or no match between two codes, an inverse FCS check unit to compare the first code with a third code obtained by inverting each bit of the second code, and to output a second comparison result indicating a match or no match between two codes, an error determination unit to determine an error state of the received frame, and an FCS update unit to update, if the second comparison result indicates no match, the second code with a fourth code obtained by inverting each bit of the first code.

9 Claims, 9 Drawing Sheets

(51) Int. Cl.
*H04L 1/00* (2006.01)
*H04L 1/24* (2006.01)
*H04L 12/24* (2006.01)

(56) References Cited

U.S. PATENT DOCUMENTS

| | | | | |
|---|---|---|---|---|
| 2006/0280204 | A1* | 12/2006 | Nagata | H04L 1/1671 370/473 |
| 2009/0103441 | A1* | 4/2009 | Nakamura | H03M 13/09 370/241 |
| 2010/0309908 | A1* | 12/2010 | Dolkas | H04L 43/50 370/389 |
| 2011/0022935 | A1* | 1/2011 | McDaniel | H04L 63/123 714/807 |
| 2015/0347218 | A1* | 12/2015 | Domingues | G06F 11/0772 714/57 |

OTHER PUBLICATIONS

Indian Office Action of Application No. 201947013853 dated Jan. 29, 2021 with English translation.

* cited by examiner

TRANSFER DEVICE AND FRAME TRANSFER METHOD

FIELD

The present invention relates to a transfer device that transfers a frame and to a frame transfer method.

BACKGROUND

There have been networks available for industrial use such as an automobile in-vehicle network, a factory automation management control network, and a train in-vehicle communication network. Although these networks have been constructed by employing standards different to each other, the networks have now started using the Ethernet® standards. The Ethernet is available at a lower cost and handles a wide range of communication speeds from a low speed to a high speed. The Ethernet has already been widely used among consumers. The Ethernet devices are relatively inexpensive and capable of performing high-speed communication. On the other hand, the Ethernet standards have conventionally not met the strict requirements for industrial use such as high reliability and low latency.

The IEEE (Institute of Electrical and Electronics Engineers) 802.3br IET (Interspersing Express Traffic) task force conducts standardization activities on the IET method that is a low-latency transfer method for making effective use of bandwidth (Non Patent Literature 1). In accordance with the IET method, a transfer device transfers an express frame that is a frame for which more strict latency is required in cut-through mode to thereby minimize the latency time. In a case where a transfer request of an express frame occurs during transfer of a normal frame that is a frame for which less strict latency is required, the transfer device discontinues and divides the transfer of a normal frame to generate an interrupt so as to transfer the express frame. After having completed the transfer of the express frame, the transfer device restarts transferring the remaining part of the divided normal frame. A link-by-link counterpart device merges the divided parts back into the original normal frame.

In frame transfer in cut-through mode, normally a transfer device has already transferred a frame at the timing at which a transmission-path error determination is completed. The transfer device thus cannot perform any discarding process on the frame. Consequently, a frame including a transmission-path error may propagate through subsequent devices. Further, the frame transfer in cut-through mode is not assumed to specify the location where a transmission-path error has occurred. Patent Literature 1 discloses a technique in which a packet transfer device that transfers a packet in cut-through mode stores an inverse CRC (Cyclic Redundancy Check) calculation result of frame data in a DCS (Data Check Sequence) field uniquely defined in a frame by the packet transfer device itself, then checks an FCS (Frame Check Sequence), and then when there is an abnormality in the frame, recalculates an FCS and replaces the checked FCS with the recalculated FCS to thereby specify the location where a fault has occurred in a network.

CITATION LIST

Patent Literature

Patent Literature 1: Japanese Patent No. 4308297

Non Patent Literature

Non Patent Literature 1: IEEE 802.3br/D2.1 IET 2015

SUMMARY

Technical Problem

However, in the conventional technique described above, the DCS field is a uniquely defined field and is thus supposed to be inserted into a data area of a frame in accordance with the Ethernet standards. This leads to a problem in that the original data length is increased by a length of the DCS field and the frame is transferred with a delay according to the increase in data length due to the DCS field.

The present invention has been achieved to solve the above problems, and an object of the present invention is to provide a transfer device capable of specifying the location where a fault has occurred when an error is detected in a frame without a delay in transferring the frame.

Solution to Problem

A transfer device according to an aspect of the present invention includes a calculation unit to calculate a first code that is a frame check sequence code of a received frame. The transfer device further includes a first comparison unit to compare the first code with a second code that is a frame check sequence code stored in the received frame, and to output a first comparison result indicating a match or no match between two codes compared with each other. The transfer device further includes a second comparison unit to compare the first code with a third code obtained by inverting each bit of the second code, and to output a second comparison result indicating a match or no match between two codes compared with each other. The transfer device further includes an error determination unit to determine an error state of the received frame on a basis of the first comparison result and the second comparison result. The transfer device further includes an update unit to update, if the second comparison result indicates no match, the second code with a fourth code obtained by inverting each bit of the first code at a time when the received frame is transferred to a subsequent device.

Advantageous Effects of Invention

According to the transfer device of the present invention, there is an effect where it is possible to specify the location where a fault has occurred when an error is detected in a frame without a delay in transferring the frame.

DESCRIPTION OF EMBODIMENTS

A transfer device and a frame transfer method according to embodiments of the present invention will be described in detail below with reference to the accompanying drawings. The present invention is not limited to the embodiments.

First Embodiment

Figure 1:
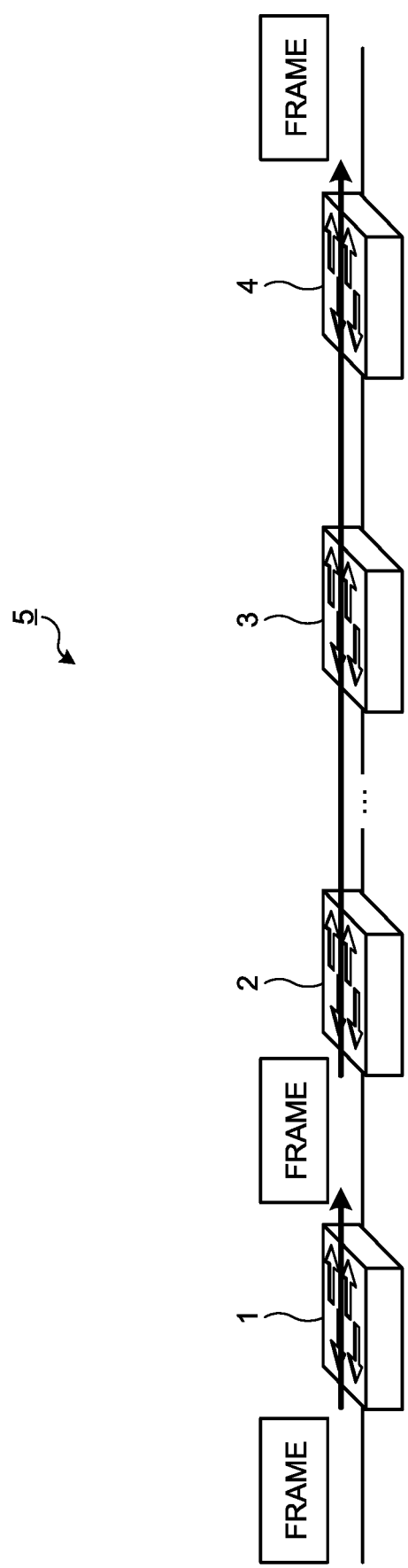
FIG. 1 is a diagram illustrating a configuration example of a network including transfer devices according to a first embodiment.

FIG. 1 is a diagram illustrating a configuration example of a network 5 including transfer devices 1 to 4 according to a first embodiment of the present invention. The network 5 includes the transfer devices 1 to 4. When the transfer device 1 receives a frame from a transfer device (not illustrated) connected on the left side, the transfer device 1 outputs the frame, that is, transfers the frame to the transfer device 2 in accordance with the IET method. In the same manner as described above, when each of the transfer devices 2 and 3 receives a frame from a transfer device connected on the left side, each of the transfer devices 2 and 3 outputs the frame to a transfer device connected on the right side. When the transfer device 4 receives a frame from the transfer device 3 connected on the left side, the transfer device 4 outputs the frame to a transfer device (not illustrated) connected on the right side. In the network 5, transfer devices similar to the transfer devices 1 to 4 are assumed to be also connected on the left side of the transfer device 1 and on the right side of the transfer device 4.

In the present embodiment, each of the transfer devices 1 to 4 detects whether a fault has occurred on the immediately-preceding transmission path to the transfer device itself regardless of whether an error in a frame has been caused by a fault having occurred at a previous transmission phase to the preceding transfer device. Due to this detection, even in a case where a fault has occurred at a plurality of locations in the network 5, each of the locations where a fault has occurred can be specified.

Figure 2:
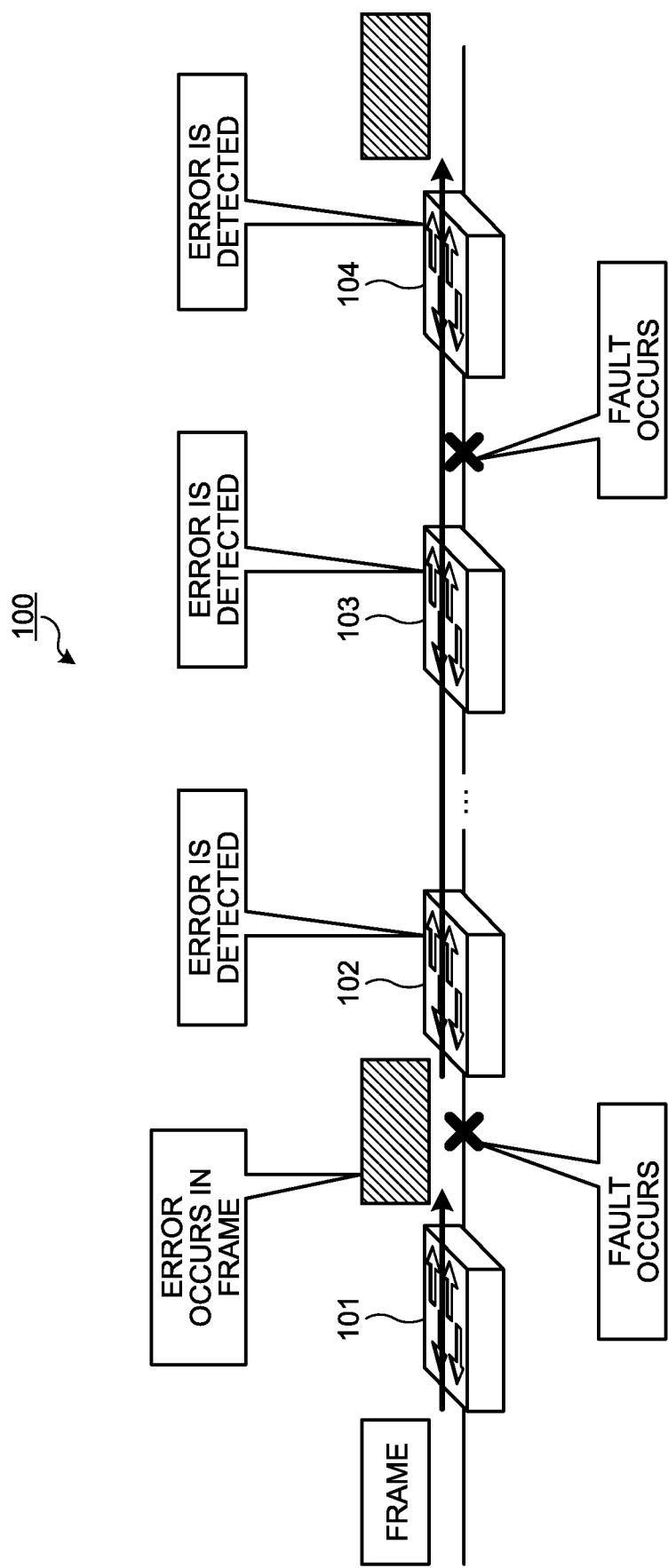
FIG. 2 is a diagram illustrating an example of a state of error detection in each transfer device when a fault has occurred in a network including general transfer devices.

In a network including general transfer devices not having the functions of the transfer devices 1 to 4 according to the present embodiment, a state of error detection in each transfer device when a fault has occurred on a transmission path is described below. FIG. 2 is a diagram illustrating an example of a state of error detection in each transfer device when a fault has occurred in a network 100 including general transfer devices 101 to 104. As illustrated in FIG. 2, when a fault occurs on a transmission path between the transfer device 101 and the transfer device 102, an error occurs in a frame that is transferred from the transfer device 101 to the transfer device 102. In this case, the transfer device 102 detects an error in the frame. The transfer device 102 transfers the frame with a detected error as it is to the next transfer device 103. Although the transfer device 103 can detect an error in the frame, the transfer device 103 cannot specify whether this error is caused by a fault having occurred on a transmission path between the transfer device 102 and the transfer device 103 or this error has propagated due to a fault having occurred at a previous transmission phase to the transfer device 102. Further, the transfer device 103 transfers the frame with a detected error as it is to the next transfer device 104. When a fault occurs on a transmission path between the transfer device 103 and the transfer device 104, an error occurs in a frame that is transferred from the transfer device 103 to the transfer device 104. In this case, although the transfer device 104 can detect an error in the frame, the transfer device 104 cannot specify whether this error is caused by a fault having occurred on a transmission path between the transfer device 103 and the transfer device 104 or this error has propagated due to a fault having occurred at a previous transmission phase to the transfer device 103. Furthermore, the transfer device 104 cannot determine whether a fault has occurred on a plurality of transmission paths.

Figure 3:
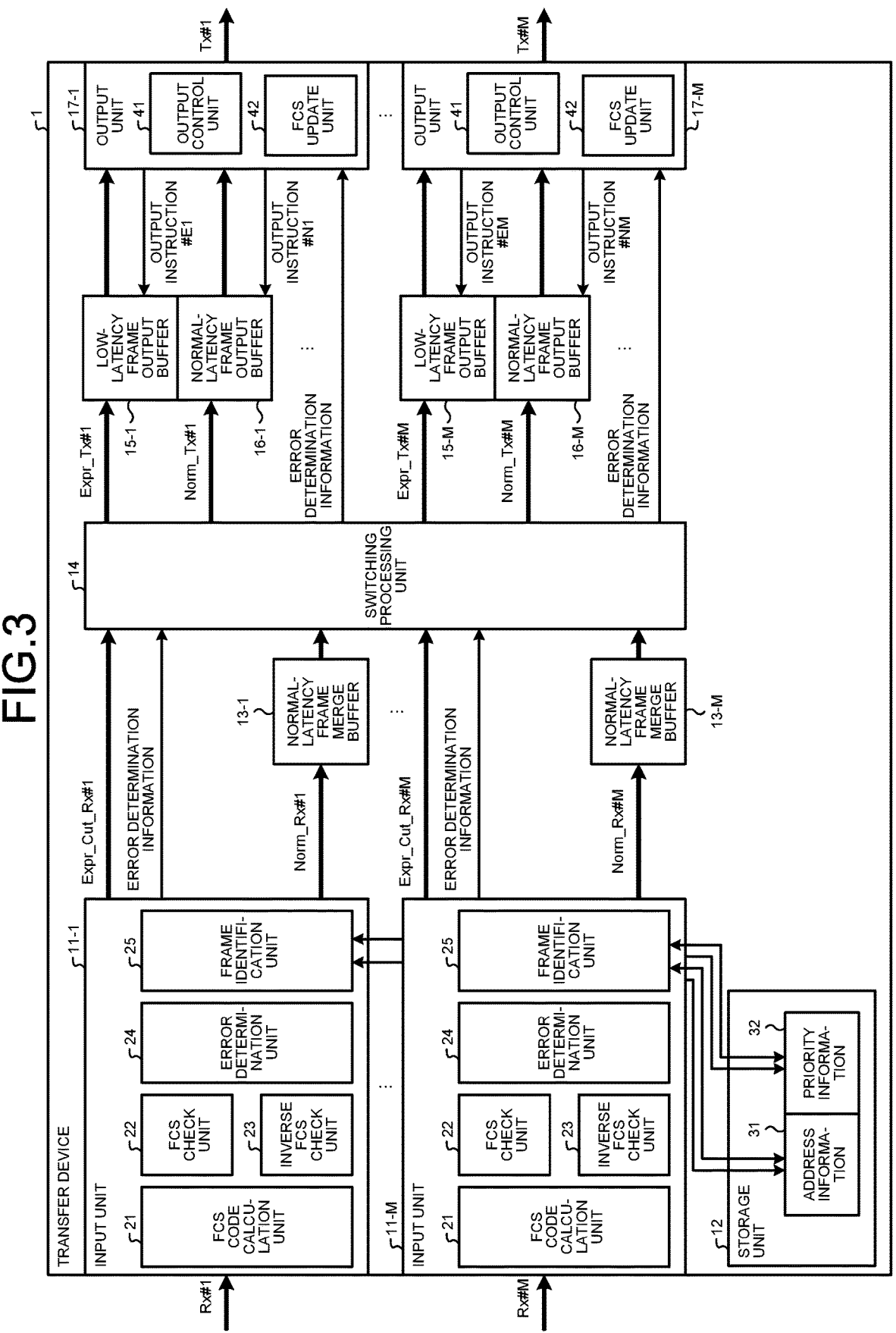
FIG. 3 is a block diagram illustrating a configuration example of the transfer device according to the first embodiment.

A configuration of the transfer devices 1 to 4 according to the present embodiment is described below. FIG. 3 is a block diagram illustrating a configuration example of the transfer device 1 according to the first embodiment. Since the transfer devices 1 to 4 have an identical configuration to each other, the configuration of the transfer device 1 is only described as an example. The transfer device 1 includes input units 11-1 to 11-M, a storage unit 12, normal-latency frame merge buffers 13-1 to 13-M, a switching processing unit 14, low-latency frame output buffers 15-1 to 15-M, normal-latency frame output buffers 16-1 to 16-M, and output units 17-1 to 17-M. While the transfer device 1 includes M input ports and M output ports as a mere example, the number of input ports and the number of output ports are not limited to M. Generally, the transfer device 1 includes two or more input/output ports. An input port denoted by Rx #n and an output port denoted by Tx #n in FIG. 3 are constituted as a single physical port in general. However, the input port and the output port may also be physically separated from each other. Note that $1 \leq n \leq M$ is set.

In the following descriptions, when the input units 11-1 to 11-M are not distinguished from each other, the input units 11-1 to 11-M are referred to as "input unit 11". Further, when the normal-latency frame merge buffers 13-1 to 13-M are not distinguished from each other, the normal-latency frame merge buffers 13-1 to 13-M are referred to as "normal-latency frame merge buffer 13". Furthermore, when the low-latency frame output buffers 15-1 to 15-M are not distinguished from each other, the low-latency frame output buffers 15-1 to 15-M are referred to as "low-latency frame output buffer 15". Further, when the normal-latency frame output buffers 16-1 to 16-M are not distinguished from each other, the normal-latency frame output buffers 16-1 to 16-M are referred to as "normal-latency frame output buffer 16". Furthermore, when the output units 17-1 to 17-M are not distinguished from each other, the output units 17-1 to 17M are referred to as "output unit 17". The low-latency frame output buffer 15 and the normal-latency frame output buffer 16 may be collectively referred to as "output-side buffer" in some cases.

The transfer device 1 includes the input unit 11 and the normal-latency frame merge buffer 13 for each input port, that is, includes M input units 11 and M normal-latency frame merge buffers 13, where M is equal to the number of input ports. The transfer device 1 also includes the low-latency frame output buffer 15, the normal-latency frame output buffer 16, and the output unit 17 for each output port, that is, includes M low-latency frame output buffers 15, M normal-latency frame output buffers 16, and M output units 17, where M is equal to the number of output ports.

In the input unit 11 on the input-port side and the output unit 17 on the output-port side, MAC (Media Access Control) is implemented using the IET technologies being standardized by the IEEE 802.3br. In accordance with the IET method, in a case where a normal-latency frame is being transferred, the transfer of a normal-latency frame is discontinued and interrupted and a low-latency frame is transferred. This interrupt transfer can satisfy the latency requirements for a low-latency frame. The low-latency frame is a frame for which low-latency transfer is required, and is also referred to as "express frame". In contrast, the normal-latency frame is a frame for which higher transfer latency is allowed than a low-latency frame, and is also referred to as "normal frame".

In the transfer device 1, the input unit 11 includes an FCS code calculation unit 21, an FCS check unit 22, an inverse FCS check unit 23, an error determination unit 24, and a frame identification unit 25.

The FCS code calculation unit 21 is a calculation unit that calculates a frame check sequence code (hereinafter, "FCS code") of a received frame having been transferred from the preceding transfer device and having been received at the input port. An FCS code calculated by the FCS code calculation unit 21 is defined as a first code.

Figure 4:
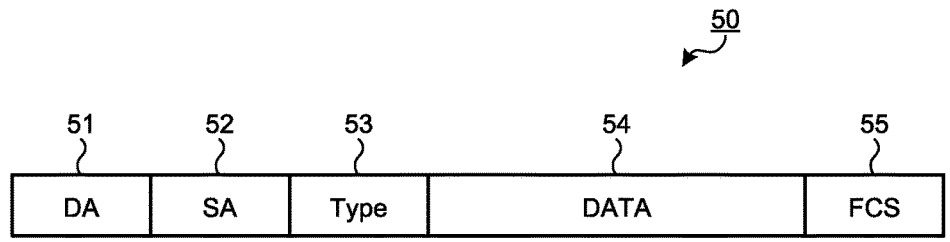
FIG. 4 is a diagram illustrating an example of a frame format for a frame to be transferred by the transfer devices according to the first embodiment.

FIG. 4 is a diagram illustrating an example of a frame format 50 for a frame to be transferred by the transfer devices 1 to 4 according to the first embodiment. Frames to be transferred by the transfer devices 1 to 4 include a low-latency frame and a normal-latency frame. Both the low-latency and normal-latency frames comply with the Ethernet standard frame format 50. The frame format 50 for a frame to be transferred by the transfer devices 1 to 4 is constituted by a DA (Destination Address) field 51 having a frame destination address stored therein, an SA (Source Address) field 52 having a frame source address stored therein, a Type field 53 having a frame length stored therein, a DATA field 54 having user data to be transmitted stored therein, and an FCS field 55 having an FCS code stored therein, the FCS code being a check code to be used for detecting an error in the fields from the DA field 51 to the DATA field 54.

The FCS code calculation unit 21 calculates an FCS code for the DA field 51, the SA field 52, the Type field 53, and the DATA field 54 of an inputted frame.

The FCS check unit 22 is a first comparison unit that compares an FCS code stored in the FCS field 55 of a received frame with an FCS code calculated by the FCS code calculation unit 21, and outputs a comparison result indicating a match or no match between the two FCS codes compared with each other. An FCS code stored in the FCS field 55 of a received frame is defined as a second code. The comparison result outputted by the FCS check unit 22 is defined as a first comparison result.

The inverse FCS check unit 23 is a second comparison unit that compares an inverse FCS code obtained by inverting each bit of an FCS code stored in the FCS field 55 of a received frame with an FCS code calculated by the FCS code calculation unit 21, and outputs a comparison result indicating a match or no match between the two FCS codes compared with each other. The inverse FCS code obtained by inverting each bit of an FCS code stored in the FCS field 55 of a received frame is defined as a third code. The comparison result outputted by the inverse FCS check unit 23 is defined as a second comparison result.

The error determination unit 24 determines an error state of a received frame on the basis of the first comparison result outputted from the FCS check unit 22 and the second comparison result outputted from the inverse FCS check unit 23. Specifically, when an error is detected in a frame, the error determination unit 24 determines a location where a fault causing the error has occurred, that is, determines whether a fault has occurred on the immediately-preceding transmission path between the transfer device itself and the preceding transfer device or a fault has occurred at a previous transmission phase to the preceding transfer device. The error determination unit 24 outputs error determination information including the second comparison result and an FCS code calculated by the FCS code calculation unit 21.

The frame identification unit 25 refers to address information 31 in the storage unit 12, for a received frame, on the basis of a destination address in the DA field 51 in the received frame, and determines a destination to which the received frame is transferred, that is, an output port for outputting the received frame. It is also allowable that the frame identification unit 25 refers to the address information 31 in the storage unit 12 by using a source address in the SA field 52 in a received frame as well as service-type information, a VLAN (Virtual Local Area Network) tag, the Ethernet-type number, and other information which are provided to the DATA field 54 or the like, and then determines a destination to which the received frame is transferred, that is, an output port for outputting the received frame.

The frame identification unit 25 refers to priority information 32 in the storage unit 12 on the basis of identification information in a received frame, which is provided to the DATA field 54 or the like, sorts the received frame into a low-latency frame or a normal-latency frame on the basis of a priority given to the received frame, and outputs the low-latency frame or normal-latency frame through separate paths to the output ports, correspondingly. For example, the identification information in a received frame includes service-type information, a VLAN tag, and the Ethernet-type number. It is also allowable that the frame identification unit 25 refers to the priority information 32 in the storage unit 12 by using a destination address in the DA field 51, a source address in the SA field 52, and the like, and sorts the received frame into a low-latency frame or a normal-latency frame on the basis of a priority given to the received frame.

The storage unit 12 has the address information 31 stored therein, to which the frame identification unit 25 refers upon determining a destination to which a received frame is transferred, that is, an output port for outputting the received frame. For example, the address information 31 indicates a relation between a destination address stored in the DA field 51 of a received frame and an output port that corresponds to a path leading to a terminal or the like indicated by the destination address. The storage unit 12 has the priority information 32 stored therein, to which the frame identification unit 25 refers upon determining a priority given to a received frame. For example, the priority information 32 indicates a relation between identification information stored in the DATA field 54 of a received frame and a priority that corresponds to each piece of identification information. The transfer device 1 is provided with the storage unit 12 that is shared between the frame identification units 25 in the input units 11-1 to 11-M to refer to. This is a mere example. Each of the frame identification units 25 in corresponding one of the input units 11-1 to 11-M may be configured to hold therein the information stored in the storage unit 12.

Each of the normal-latency frame merge buffers 13-1 to 13-M perform a merging process on a normal-latency frame. Each of the normal-latency frame merge buffers 13-1 to 13-M is a input-side buffer for normal-latency frame to transfer normal-latency frames in store-and-forward mode. It is sufficient for the transfer device 1 that a merging process on divided normal-latency frames is completed before the output unit 17 starts controlling an output conflict with a low-latency frame in accordance with the IET. For this reason, the location of the normal-latency frame merge buffers 13-1 to 13-M is not limited as long as the normal-latency frame merge buffers 13-1 to 13-M are located at any preceding position to the output units 17. Accordingly, the normal-latency frame merge buffers 13-1 to 13-M may be configured to also serve as the normal-latency frame output buffers 16-1 to 16-M.

The switching processing unit 14 sorts a received frame in accordance with a transfer destination determined by the frame identification unit 25 in each input unit 11, that is, performs a switching process. The switching processing unit 14 outputs a low-latency frame outputted from the input unit 11 to the low-latency frame output buffer 15 corresponding to the output port for the transfer destination. The switching processing unit 14 outputs a normal-latency frame outputted from the normal-latency frame merge buffer 13 to the normal-latency frame output buffer 16 corresponding to the output port for the transfer destination. Further, the switching processing unit 14 outputs error determination information outputted from the input unit 11 to the output unit 17 corresponding to the output port to which the target frame is outputted.

Each of the low-latency frame output buffer 15 accumulates therein low-latency frames among frames received at corresponding one of the input ports. The low-latency frame output buffer 15 is capable of outputting a frame in cut-through mode, that is, starting outputting a frame without waiting for the entire frame to be completely accumulated. The low-latency frame output buffer 15 outputs a low-latency frame to corresponding one of the output units 17 in accordance with output instructions from the output unit 17. Further, when a low-latency frame is inputted from the switching processing unit 14, the low-latency frame output buffer 15 outputs a low-latency frame reception notification to the corresponding output unit 17. The low-latency frame reception notification indicates that the low-latency frame output buffer 15 has accumulated therein a low-latency frame, that is, the transfer device 1 has received a low-latency frame.

Each of the normal-latency frame output buffers 16 accumulates therein normal-latency frames among frames received at corresponding one of the input ports. When a normal-latency frame is inputted after having been merged by the normal-latency frame merge buffer 13, the normal-latency frame output buffer 16 is capable of outputting the merged normal-latency frame in cut-through mode. In a case where the normal-latency frame output buffer 16 also serves as the corresponding normal-latency frame merge buffer 13 as described above, when a normal-latency frame is inputted before being merged, the frame is outputted in store-and-forward mode in which the frame starts being outputted after accumulation of the entire frame has been completed. The normal-latency frame output buffer 16 outputs a normal-latency frame to corresponding one of the output units 17 in accordance with output instructions from the output unit 17.

The output unit 17 includes an output control unit 41 and an FCS update unit 42.

In accordance with the IET method, the output control unit 41 gives a higher priority to outputting a low-latency frame stored in the low-latency frame output buffer 15 than a normal-latency frame stored in the normal-latency frame output buffer 16. When a low-latency frame is to be outputted, the output control unit 41 instructs the low-latency frame output buffer 15 to output the same. When a normal-latency frame is to be outputted, the output control unit 41 instructs the normal-latency frame output buffer 16 to output the same.

In a case where the second comparison result indicates no match on the basis of error determination information obtained from the switching processing unit 14, that is, in a case where a fault has occurred on the immediately-preceding transmission path between the transfer device itself and the preceding transfer device, when a received frame that is a low-latency frame or a normal-latency frame to be output is transferred to the subsequent transfer device, the FCS update unit 42 updates an FCS code stored in the received frame with an inverse FCS code obtained by inverting each bit of an FCS code that is calculated by the FCS code calculation unit 21. The inverse FCS code obtained by inverting each bit of an FCS code calculated by the FCS code calculation unit 21 is defined as a fourth code. The FCS update unit 42 uses an FCS code that is calculated by the FCS code calculation unit 21 and included in error determination information.

Figure 5:
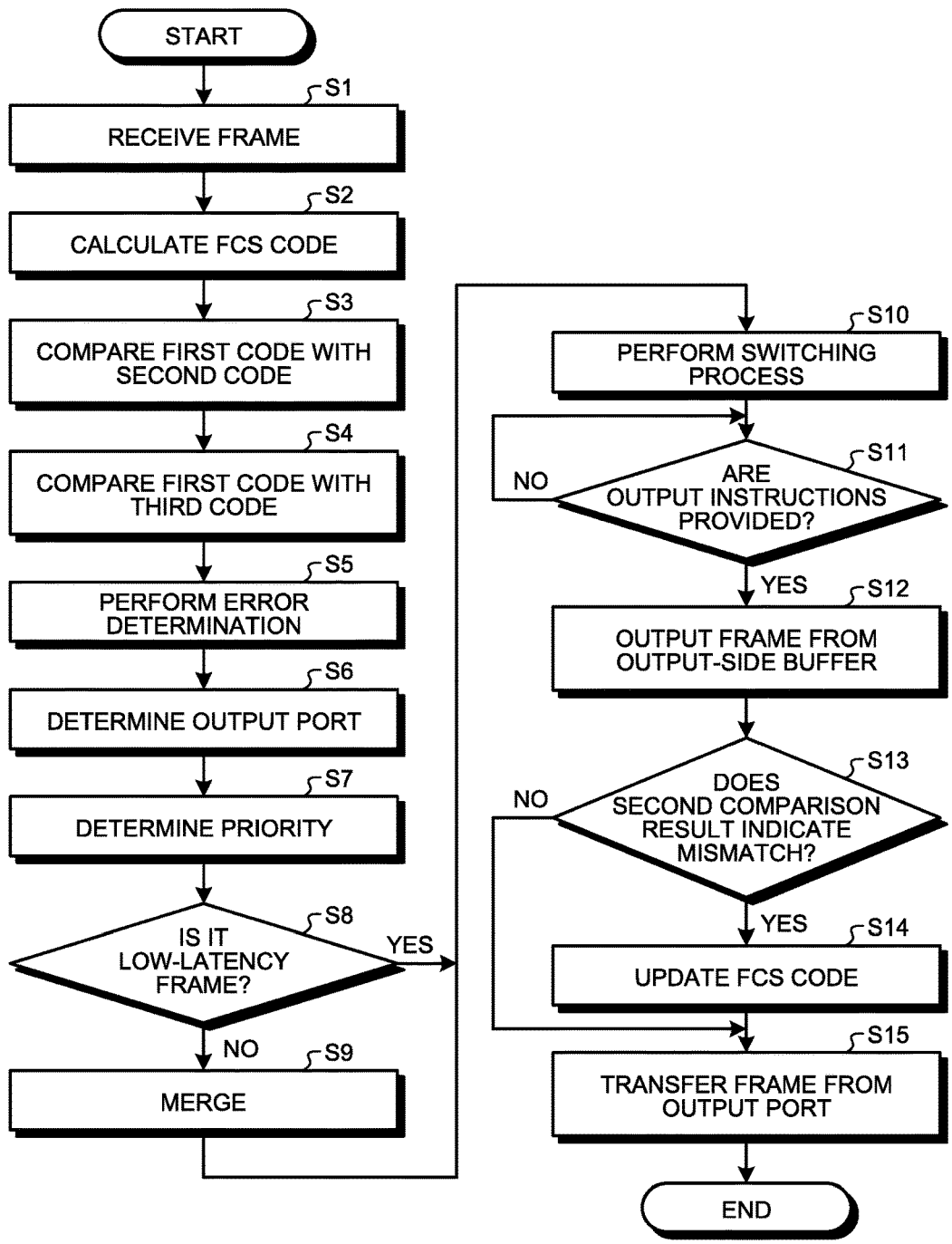
FIG. 5 is a flowchart illustrating frame transfer processing in the transfer device according to the first embodiment.

Next, frame transfer processing in the transfer device 1 is described. FIG. 5 is a flowchart illustrating frame transfer processing in the transfer device 1 according to the first embodiment.

First, the transfer device 1 receives a frame from the preceding transfer device not illustrated in FIG. 1 (Step S1).

In the input unit 11 in the transfer device 1, the FCS code calculation unit 21 calculates an FCS code of a received frame (Step S2).

The FCS check unit 22 compares a first code that is an FCS code calculated by the FCS code calculation unit 21 with a second code that is an FCS code stored in the FCS field 55 of a received frame (Step S3). The FCS check unit 22 outputs a first comparison result to the error determination unit 24.

The inverse FCS check unit 23 compares the first code that is an FCS code calculated by the FCS code calculation unit 21 with a third code that is an inverse FCS code obtained by inverting each bit of an FCS code stored in the FCS field 55 of a received frame (Step S4). The inverse FCS check unit 23 outputs a second comparison result to the error determination unit 24. It is also allowable that the input unit 11 performs processes at Steps S3 and S4 in parallel and simultaneously.

On the basis of the first comparison result outputted by the FCS check unit 22 and the second comparison result outputted by the inverse FCS check unit 23, the error determination unit 24 determines whether an error is detected in a received frame, that is, an error has occurred in a received frame (Step S5). The error determination unit 24 determines that an error has not occurred in a received frame when the first comparison result outputted by the FCS check unit 22 indicates a match, that is, when an FCS code stored in the FCS field 55 of a received frame is identical to an FCS code calculated by the FCS code calculation unit 21.

The error determination unit 24 further refers to the second comparison result outputted by the inverse FCS check unit 23 when the first comparison result outputted by the FCS check unit 22 indicates no match, that is, when an FCS code stored in the FCS field 55 of a received frame is different from an FCS code calculated by the FCS code calculation unit 21.

When the second comparison result outputted by the inverse FCS check unit 23 indicates a match, that is, an inverse FCS code of a received frame is identical to an FCS code calculated by the FCS code calculation unit 21, the error determination unit 24 determines that although an error has occurred in a received frame, a fault has not occurred on the immediately-preceding transmission path between the transfer device itself and the preceding transfer device, but has occurred at a previous transmission phase to the preceding transfer device.

In contrast, when the second comparison result obtained by the inverse FCS check unit 23 indicates no match, that is, an inverse FCS code of a received frame is different from an FCS code calculated by the FCS code calculation unit 21, the error determination unit 24 determines that a fault has occurred on the immediately-preceding transmission path between the transfer device itself and the preceding transfer device.

The error determination unit 24 outputs the second comparison result and error determination information that includes an FCS code calculated by the FCS code calculation unit 21 to the switching processing unit 14. It is allowable that, when the second comparison result indicates a match, the error determination unit 24 does not include an FCS code calculated by the FCS code calculation unit 21 in error determination information.

The frame identification unit 25 refers to the address information 31 in the storage unit 12 to determine an output port for a received frame (Step S6). Further, the frame identification unit 25 refers to the priority information 32 in the storage unit 12 to determine a priority given to a received frame, that is, whether the received frame is a low-latency frame or a normal-latency frame (Step S7).

When the received frame is a low-latency frame (YES at Step S8), the frame identification unit 25 outputs the low-latency frame to the switching processing unit 14. When the received frame is a normal-latency frame (NO at Step S8), the frame identification unit 25 outputs the normal-latency frame to the corresponding normal-latency frame merge buffer 13. In a case where the normal-latency frame has been divided into parts, the normal-latency frame merge buffer 13 merges the parts back into the normal-latency frame (Step S9) and then outputs the merged normal-latency frame to the switching processing unit 14.

The switching processing unit 14 performs a switching process to output a received frame to an output buffer corresponding to the output port determined by the frame identification unit 25 (Step S10). Specifically, the switching processing unit 14 outputs a low-latency frame to the low-latency frame output buffer 15 corresponding to the output port determined by the frame identification unit 25. The switching processing unit 14 also outputs a normal-latency frame to the normal-latency frame output buffer 16 corresponding to the output port determined by the frame identification unit 25. Further, the switching processing unit 14 performs a switching process to output error determination information to the output unit 17 that corresponds to the output port determined by the frame identification unit 25.

The low-latency frame output buffer 15 is on standby until the output control unit 41 in the output unit 17 provides the low-latency frame output buffer 15 with output instructions (NO at Step S11). When the output control unit 41 provides the low-latency frame output buffer 15 with output instructions (YES at Step S11), the low-latency frame output buffer 15 outputs a low-latency frame (Step S12). Similarly to the manner described above, the normal-latency frame output buffer 16 is on standby until the output control unit 41 provides the normal-latency frame output buffer 16 with output instructions (NO at Step S11). When the output control unit 41 provides the normal-latency frame output buffer 16 with output instructions (YES at Step S11), the normal-latency frame output buffer 16 outputs a normal-latency frame (Step S12). The output control unit 41 executes a frame output control by providing each output-side buffer with such output instructions as to give a higher priority to outputting a low-latency frame than a normal-latency frame in accordance with the IET method as described above.

When the second comparison result indicates no match on the basis of error determination information (YES at Step S13), the FCS update unit 42 in the output unit 17 updates an FCS code in the FCS field 55 of a low-latency frame or a normal-latency frame with an inverse FCS code obtained by inverting each bit of an FCS code calculated by the FCS code calculation unit 21 (Step S14). The output control unit 41 outputs a low-latency frame or a normal-latency frame from the output port to the subsequent transfer device, that is, transfers a low-latency frame or a normal-latency frame (Step S15). When the second comparison result indicates a match on the basis of error determination information (NO at Step S13), the FCS update unit 42 does not update the FCS code. In this case, the output unit 17 omits a process at Step S14, and the output control unit 41 outputs a low-latency frame or a normal-latency frame from the output port to the subsequent transfer device, that is, transfers a low-latency frame or a normal-latency frame (Step S15).

Figure 6:
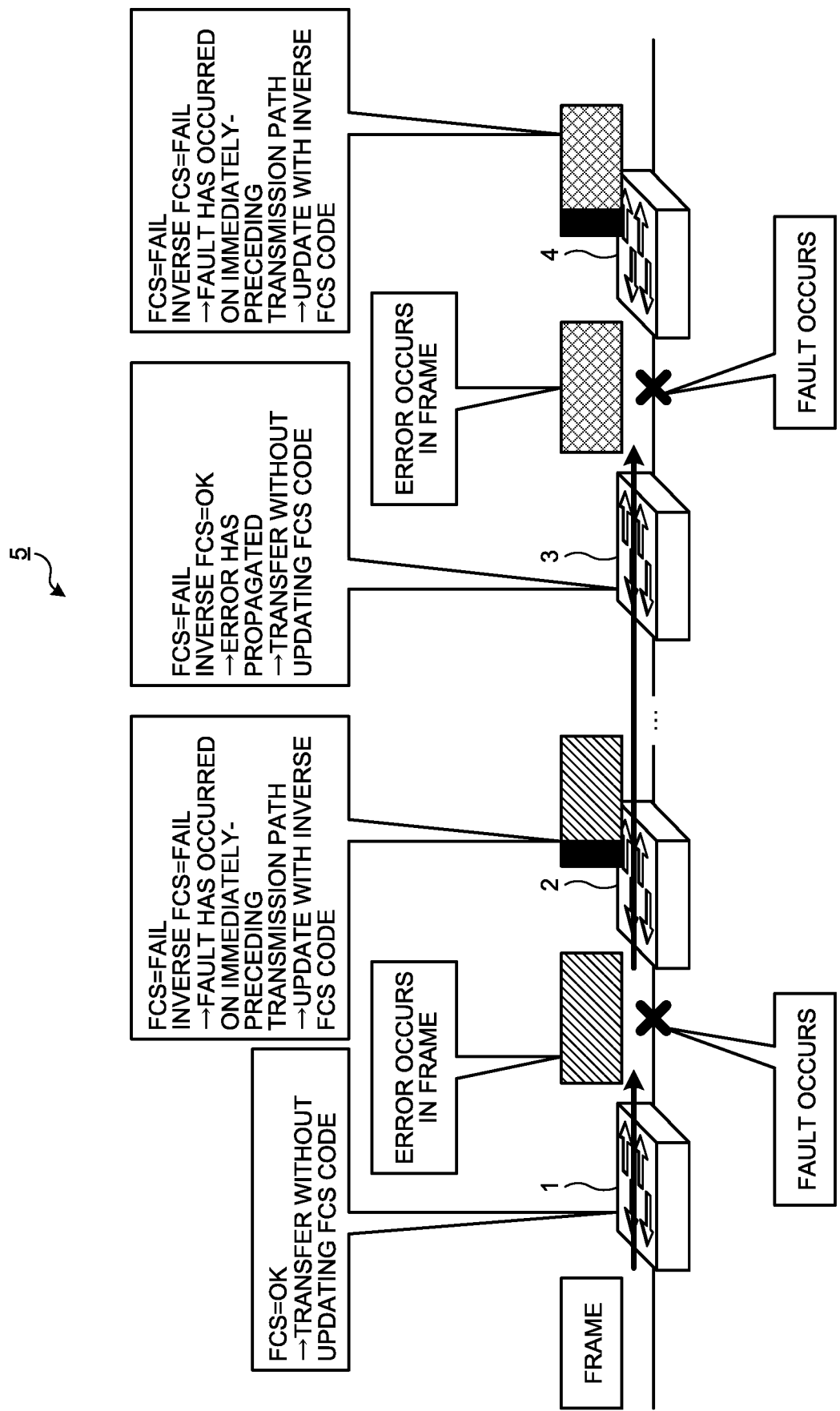
FIG. 6 is a diagram illustrating an example of a state of error detection in the transfer devices when a fault has occurred on a plurality of transmission paths in the network according to the first embodiment.

FIG. 6 is a diagram illustrating an example of a state of error detection in the transfer devices 1 to 4 when a fault has occurred on a plurality of transmission paths in the network 5 according to the first embodiment. In FIG. 6, a match between a calculated FCS code and an FCS code in the FCS field 55 of a received frame is indicated as "FCS=OK", while no match between these codes is indicated as "FCS=FAIL". Also in FIG. 6, a match between a calculated FCS code and an inverse FCS code obtained by inverting each bit of an FCS code in the FCS field 55 of a received frame is indicated as "inverse FCS=OK", while no match between these codes is indicated as "inverse FCS=FAIL".

When a calculated FCS code matches an FCS code in the FCS field 55 of a received frame, the transfer device 1 transfers the frame as it is without updating the FCS code in the FCS field 55.

When a calculated FCS code does not match an FCS code in the FCS field 55 of a received frame, and the calculated FCS code does not match an inverse FCS code obtained by inverting each bit of the FCS code in the FCS field 55 of a received frame, the transfer device 2 determines that a fault has occurred on the immediately-preceding transmission path. The transfer device 2 transfers the frame having the FCS code in the FCS field 55 updated with an inverse FCS code obtained by inverting each bit of the calculated FCS code.

When a calculated FCS code does not match an FCS code in the FCS field 55 of a received frame, and the calculated FCS code matches an inverse FCS code obtained by inverting each bit of the FCS code in the FCS field 55 of a received frame, the transfer device 3 determines that a fault has occurred at a previous transmission phase to the transfer device 2, but has not occurred on the immediately-preceding transmission path. The transfer device 3 determines that the frame error has propagated due to a fault having occurred at a previous transmission phase to the transfer device 2, and then transfers the frame as it is without updating the FCS code in the FCS field 55.

When a calculated FCS code does not match an FCS code in the FCS field 55 of a received frame, and the calculated FCS code does not match an inverse FCS code obtained by inverting each bit of the FCS code in the FCS field 55 of a received frame, the transfer device 4 determines that a fault has occurred on the immediately-preceding transmission path. The transfer device 4 transfers the frame having the FCS code in the FCS field 55 updated with an inverse FCS code obtained by inverting each bit of the calculated FCS code.

In the manner as described above, each of the transfer devices 1 to 4 can detect an error and distinguish whether the error is caused by a fault having occurred on the immediately-preceding transmission path or the error has propagated. Due to this operation, it is possible in the network 5 to detect the location where an error has occurred, that is, which of the transmission paths between the transfer devices causes the error.

Next, a hardware configuration of the transfer devices 1 to 4 is described. Because the transfer devices 1 to 4 have an identical configuration to each other, the configuration of the transfer device 1 is only described as an example. In the transfer device 1, the input unit 11, the storage unit 12, the normal-latency frame merge buffer 13, the switching processing unit 14, the low-latency frame output buffer 15, the normal-latency frame output buffer 16, and the output unit 17 are implemented by a processing circuit. That is, the transfer device 1 includes a processing circuit for calculating an FCS code of a received frame, comparing an FCS code in the received frame with the calculated FCS code, comparing an inverse FCS code obtained by inverting each bit of the FCS code in the received frame with the calculated FCS code. The transfer device 1 updates and outputs the FCS code of the frame when an error is determined to be detected in the frame due to a fault having occurred on the immediately-preceding transmission path between the transfer device itself and the preceding transfer device. It is allowable that the processing circuit is dedicated hardware, or a memory and a CPU (Central Processing unit) that executes a program stored in the memory.

Figure 7:
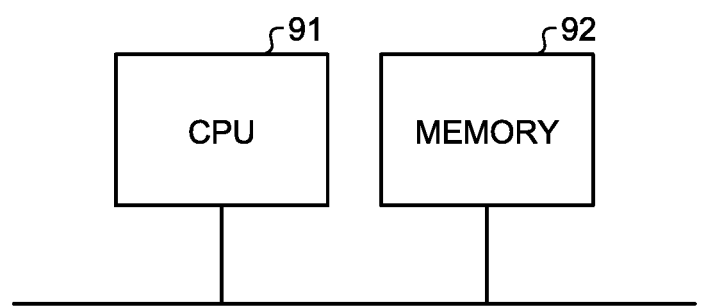
FIG. 7 is a diagram illustrating an example in which a processing circuit of the transfer device according to the first embodiment is configured by a CPU and a memory.

FIG. 7 is a diagram illustrating an example in which the processing circuit of the transfer device 1 according to the first embodiment is configured by a CPU and a memory. In a case where the processing circuit is configured by a CPU 91 and a memory 92, the functions of the transfer device 1 are implemented by software, firmware, or a combination of the software and the firmware. The software or firmware is described as a program and stored in the memory 92. In the processing circuit, the CPU 91 reads and executes the program stored in the memory 92 to thereby implement each of the functions. That is, the transfer device 1 includes the memory 92 to store therein a program for causing steps described below to be consequently executed when the input unit 11, the storage unit 12, the normal-latency frame merge buffer 13, the switching processing unit 14, the low-latency frame output buffer 15, the normal-latency frame output buffer 16, and the output unit 17 are implemented by the processing circuit. The steps include a step of calculating an FCS code of a received frame, a step of comparing an FCS code in the received frame with the calculated FCS code, a step of comparing an inverse FCS code obtained by inverting each bit of the FCS code in the received frame with the calculated FCS code, and a step of updating and outputting the FCS code of the frame when an error is determined to be detected in the frame due to a fault having occurred on the immediately-preceding transmission path between the transfer device itself and the preceding transfer device. These programs are also regarded as causing a computer to execute the procedure and method of the transfer device 1. The CPU 91 can be a processing device, an arithmetic device, a microprocessor, a microcomputer, a processor, a DSP (Digital Signal Processor) or the like. Further, the memory 92 corresponds to a nonvolatile or volatile semiconductor memory such as a RAM (Random Access Memory), a ROM (Read Only Memory), a flash memory, an EPROM (Erasable Programmable ROM), or an EEPROM (Electrically EPROM), a magnetic disk, a flexible disk, an optical disk, a compact disk, a mini disk, or a DVD (Digital Versatile Disk).

Figure 8:
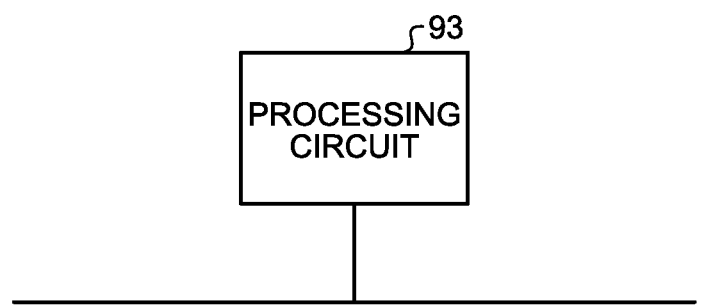
FIG. 8 is a diagram illustrating an example in which the processing circuit of the transfer device according to the first embodiment is configured by dedicated hardware.

FIG. 8 is a diagram illustrating an example in which the processing circuit of the transfer device 1 according to the first embodiment is configured by dedicated hardware. When the processing circuit is dedicated hardware, for example, a single circuit, a combined circuit, a programmed processor, a parallel-programmed processor, an ASIC (Application Specific Integrated Circuit), an FPGA (Field Programmable Gate Array), or a combination thereof corresponds to a processing circuit 93 illustrated in FIG. 8. The functions of the transfer device 1 may be implemented by individual processing circuits 93 or may be collectively implemented by a single processing circuit 93.

A part of the respective functions of the transfer device 1 can be realized by dedicated hardware, and other parts thereof can be realized by software or firmware. In this manner, the processing circuits can the respective functions described above with dedicated hardware, software, firmware, or a combination thereof.

As described above, according to the present embodiment, each of the transfer devices 1 to 4 calculates an FCS code of a received frame, compares an FCS code in the received frame with the calculated FCS code, compares an inverse FCS code obtained by inverting each bit of the FCS code in the received frame with the calculated FCS code, and updates and outputs the FCS code of the frame when an error is determined to be detected in the frame due to a fault having occurred on the immediately-preceding transmission path between the transfer device itself and the preceding transfer device. Due to this operation, each of the transfer devices 1 to 4 transfers a frame with a rewritten FCS code and thus does not insert additional data in the frame. For this reason, each of the transfer devices 1 to 4 is capable of detecting the location where an error has occurred in the network 5, that is, which of the transmission paths between the transfer devices causes the error without a delay in transferring the frame.

Second Embodiment

In the first embodiment, each of the transfer devices 1 to 4 in the network 5 is a device having the functions described in the first embodiment, that is, a device capable of using an inverse FCS code. In a second embodiment, a case is described where a network includes a terminal incapable of using an inverse FCS code. In the second embodiment, differences from the first embodiment are described.

Figure 9:
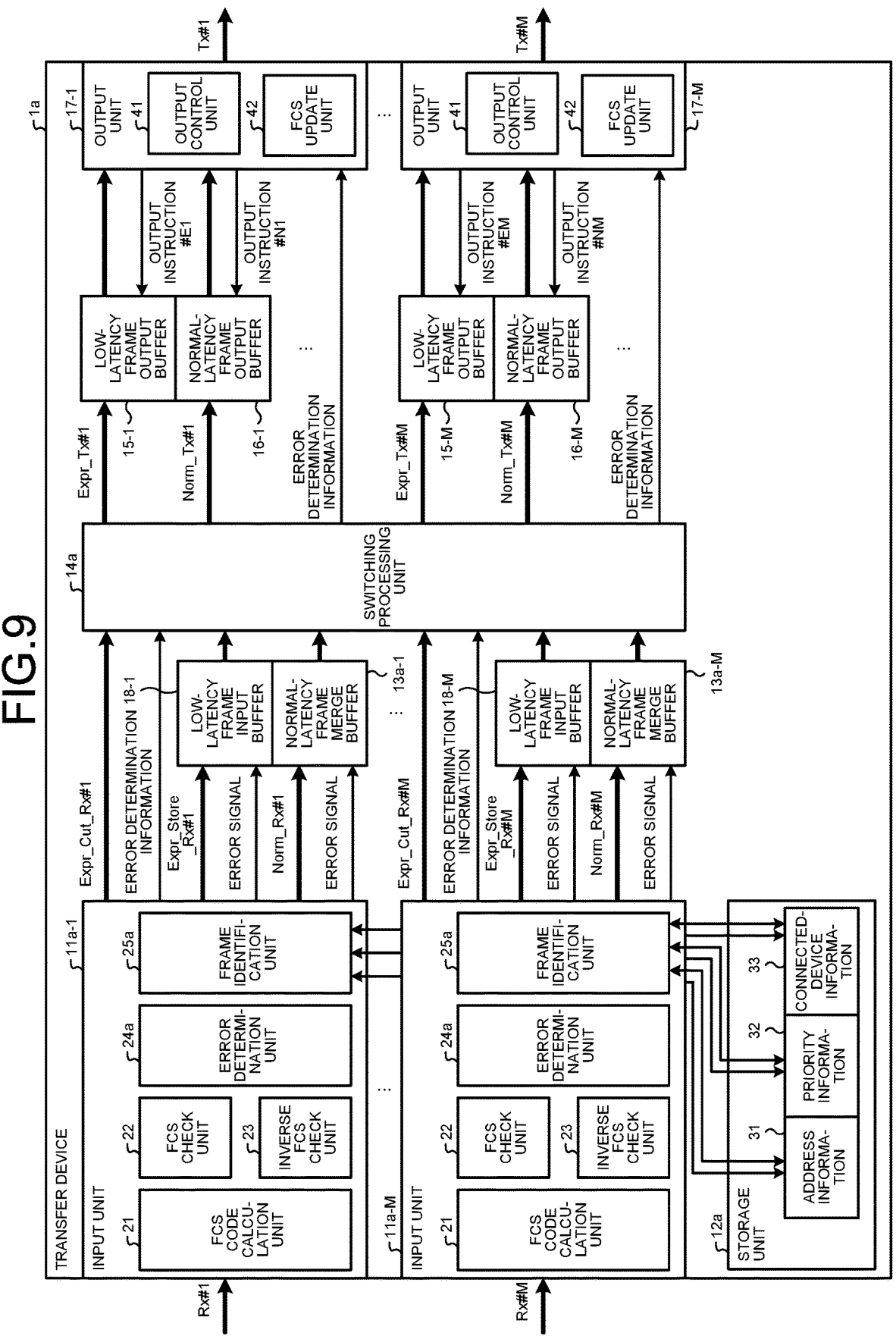
FIG. 9 is a block diagram illustrating a configuration example of a transfer device according to a second embodiment.

FIG. 9 is a block diagram illustrating a configuration example of a transfer device 1a according to the second embodiment. The transfer device 1a is configured by omitting the input units 11-1 to 11-M, the storage unit 12, the normal-latency frame merge buffers 13-1 to 13-M, and the switching processing unit 14 from the transfer device 1 and by adding input units 11a-1 to 11a-M, a storage unit 12a, normal-latency frame merge buffers 13a-1 to 13a-M, a switching processing unit 14a, and low-latency frame input buffers 18-1 to 18-M to the transfer device 1.

In the following descriptions, when the input units 11a-1 to 11a-M are not distinguished from each other, the input units 11a-1 to 11a-M are referred to as "input unit 11a". Further, when the normal-latency frame merge buffers 13a-1 to 13a-M are not distinguished from each other, the normal-latency frame merge buffers 13a-1 to 13a-M are referred to as "normal-latency frame merge buffer 13a". Furthermore, when the low-latency frame input buffers 18-1 to 18-M are not distinguished from each other, the low-latency frame input buffers 18-1 to 18-M are referred to as "low-latency frame input buffer 18". The transfer device 1a includes the input unit 11a, the normal-latency frame merge buffer 13a, and the low-latency frame input buffer 18 for each input port, that is, includes M input units 11a, M normal-latency frame merge buffers 13a, and M low-latency frame input buffers 18, where M is equal to the number of input ports.

In the input unit 11a, the error determination unit 24 and the frame identification unit 25 in the input unit 11 are replaced with an error determination unit 24a and a frame identification unit 25a, respectively.

The error determination unit 24a operates in the same manner as the error determination unit 24. However, when an error is detected in a received frame, that is, when the first comparison result indicates no match, the error determination unit 24a outputs an error signal indicating that an error has occurred in the received frame.

In addition to the function of the frame identification unit 25, the frame identification unit 25a refers to connected-device information 33 in the storage unit 12a on the basis of a destination address in the DA field 51 in the frame, and determines whether a frame transfer destination, that is, the subsequent device connected to the output port for outputting the frame handles the processing according to the first embodiment. Specifically, the frame identification unit 25a determines whether the subsequent device is capable of using an inverse FCS code obtained by inverting each bit of an FCS code stored in the FCS field 55 of a received frame. It is also allowable that the frame identification unit 25a refers to the connected-device information 33 in the storage unit 12a by using a source address in the SA field 52 in the frame as well as service-type information, a VLAN tag, the Ethernet-type number, and other information which are provided to the DATA field 54 or the like, and then determines whether a device connected to the output port for outputting the frame is capable of using an inverse FCS code. In a case where a device connected to the output port for outputting the frame cannot use an inverse FCS code, the frame identification unit 25a outputs an error signal from the error determination unit 24a to the normal-latency frame merge buffer 13a or the low-latency frame input buffer 18 to which the frame is outputted.

In addition to the address information 31 and the priority information 32, the storage unit 12a has the connected-device information 33 stored therein to be referred to by the frame identification unit 25a upon determining whether a device connected to the output port for outputting the frame is capable of using an inverse FCS code. For example, the connected-device information 33 indicates a correspondence relation between a destination address stored in the DA field 51 of a frame and whether a terminal indicated by the destination address is capable of using an inverse FCS code.

In a case of transferring a low-latency frame to the subsequent device incapable of using an inverse FCS code, each of the low-latency frame input buffers 18-1 to 18-M transfers the low-latency frame in store-and-forward mode. Accordingly, each of the low-latency frame input buffers 18-1 to 18-M temporarily stores therein the low-latency frame. The low-latency frame input buffers 18-1 to 18-M are input-side buffers for a low-latency frame. When each of the low-latency frame input buffers 18-1 to 18-M obtains an error signal along with a low-latency frame from the input unit 11a, each of the low-latency frame input buffers 18-1 to 18-M does not output the low-latency frame, but discards this low-latency frame.

obtaining an error signal along with a normal-latency frame from the input unit 11a, each of the normal-latency frame merge buffers 13a-1 to 13a-M does not output the normal-latency frame, but discards this normal-latency frame, in addition to performing the function of the normal-latency frame merge buffer 13. The normal-latency frame merge buffers 13a-1 to 13a-M are input-side buffers for a normal-latency frame.

In addition to the function of the switching processing unit 14, the switching processing unit 14a outputs a low-latency frame having been inputted from the low-latency frame input buffer 18 to the low-latency frame output buffer 15 that corresponds to the output port for the frame transfer destination.

In a case where a device connected to the output port for the frame transfer destination, that is, the subsequent device is capable of using an inverse FCS code, the transfer device 1a transfers a low-latency frame in cut-through mode in the same manner as in the first embodiment. In contrast, in a case where the subsequent device is incapable of using an inverse FCS code, the transfer device 1a transfers a low-latency frame via the low-latency frame input buffer 18 in store-and-forward mode differently from the first embodiment.

Figure 10:
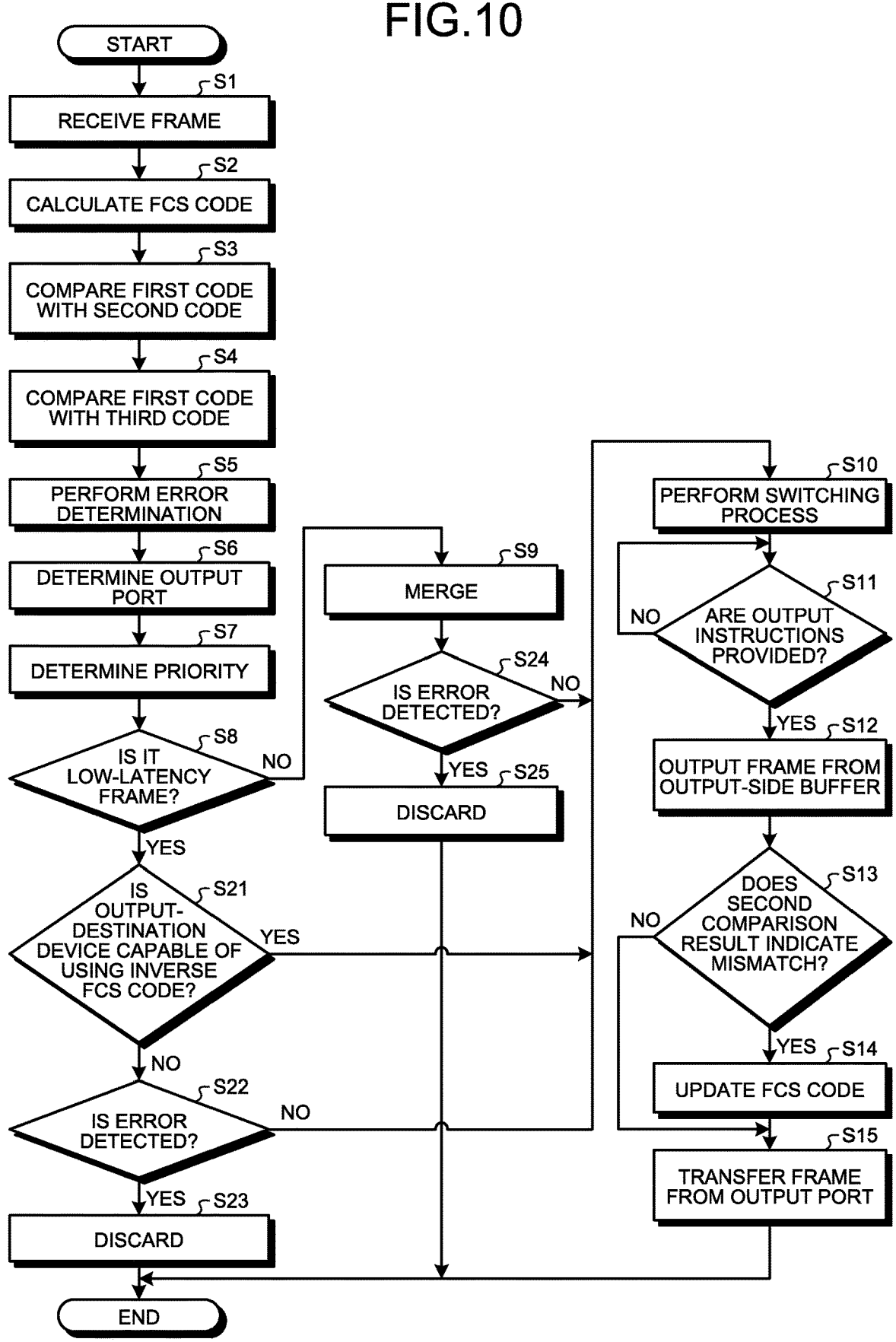
FIG. 10 is a flowchart illustrating frame transfer processing in the transfer device according to the second embodiment.

Next, frame transfer processing in the transfer device 1a is described. FIG. 10 is a flowchart illustrating frame transfer processing in the transfer device 1a according to the second embodiment. Processes at Steps S1 to S8 are the same as those in the first embodiment illustrated in FIG. 5.

When a received frame is a low-latency frame (YES at Step S8), the frame identification unit 25a determines whether a device connected to the output port for a destination to which a low-latency frame is outputted is capable of using an inverse FCS code (Step S21). When the device is capable of using an inverse FCS code (YES at Step S21), the frame identification unit 25a outputs a low-latency frame to the switching processing unit 14a. When the device is incapable of using an inverse FCS code (NO at Step S21), the frame identification unit 25a outputs a low-latency frame to the low-latency frame input buffer 18.

The low-latency frame input buffer 18 determines whether an error is detected in the low-latency frame (Step S22). When the low-latency frame input buffer 18 obtains a low-latency frame without an error signal, the low-latency frame input buffer 18 determines that an error is not detected in the low-latency frame (NO at Step S22) and then outputs the low-latency frame to the switching processing unit 14a. When the low-latency frame input buffer 18 obtains an error signal along with a low-latency frame, the low-latency frame input buffer 18 determines that an error is detected in the low-latency frame (YES at Step S22) and then discards the low-latency frame (Step S23).

In a case where a normal-latency frame has been divided into parts, the normal-latency frame merge buffer 13a merges the parts back into the normal-latency frame (Step S9) and then determines whether an error is detected in the normal-latency frame (Step S24). When the normal-latency frame merge buffer 13a obtains a normal-latency frame without an error signal, the normal-latency frame merge buffer 13a determines that an error is not detected in the normal-latency frame (NO at Step S24) and then outputs the normal-latency frame to the switching processing unit 14a. When the normal-latency frame merge buffer 13a obtains an error signal along with a normal-latency frame, the normal-latency frame merge buffer 13a determines that an error is detected in the normal-latency frame (YES at Step S24) and then discards the normal-latency frame (Step S25).

Processes at Steps S10 to S15 are the same as those in the first embodiment illustrated in FIG. 5.

In the manner as described above, in the transfer device 1a, when a device connected to the output port for the destination, to which a frame determined as a low-latency frame is transferred, is capable of using an inverse FCS code, the frame identification unit 25a in the input unit 11a outputs the low-latency frame to the switching processing unit 14a to transfer this low-latency frame in cut-through mode. Further, when a device connected to the output port for the destination, to which a frame determined as a low-latency frame is transferred, is incapable of using an inverse FCS code, the frame identification unit 25a outputs the low-latency frame to the low-latency frame input buffer 18 to transfer this low-latency frame in store-and-forward mode. As for a normal-latency frame, the frame identification unit 25a outputs a normal-latency frame to the normal-latency frame merge buffer 13a and transfers this normal-latency frame in store-and-forward mode regardless of whether a device connected to the output port for the frame transfer destination is capable of using an inverse FCS code.

In a case where a frame is determined as having an error by the error determination unit 24a and a device connected to the output port for the transfer destination is incapable of using an inverse FCS code, the frame identification unit 25a outputs an error signal along with the frame to the low-latency frame input buffer 18 or the normal-latency frame merge buffer 13a. When the low-latency frame input buffer 18 obtains an error signal along with a low-latency frame, the low-latency frame input buffer 18 discards the low-latency frame. Further, when the normal-latency frame merge buffer 13a obtains an error signal along with a normal-latency frame, the normal-latency frame merge buffer 13a discards the normal-latency frame.

Figure 11:
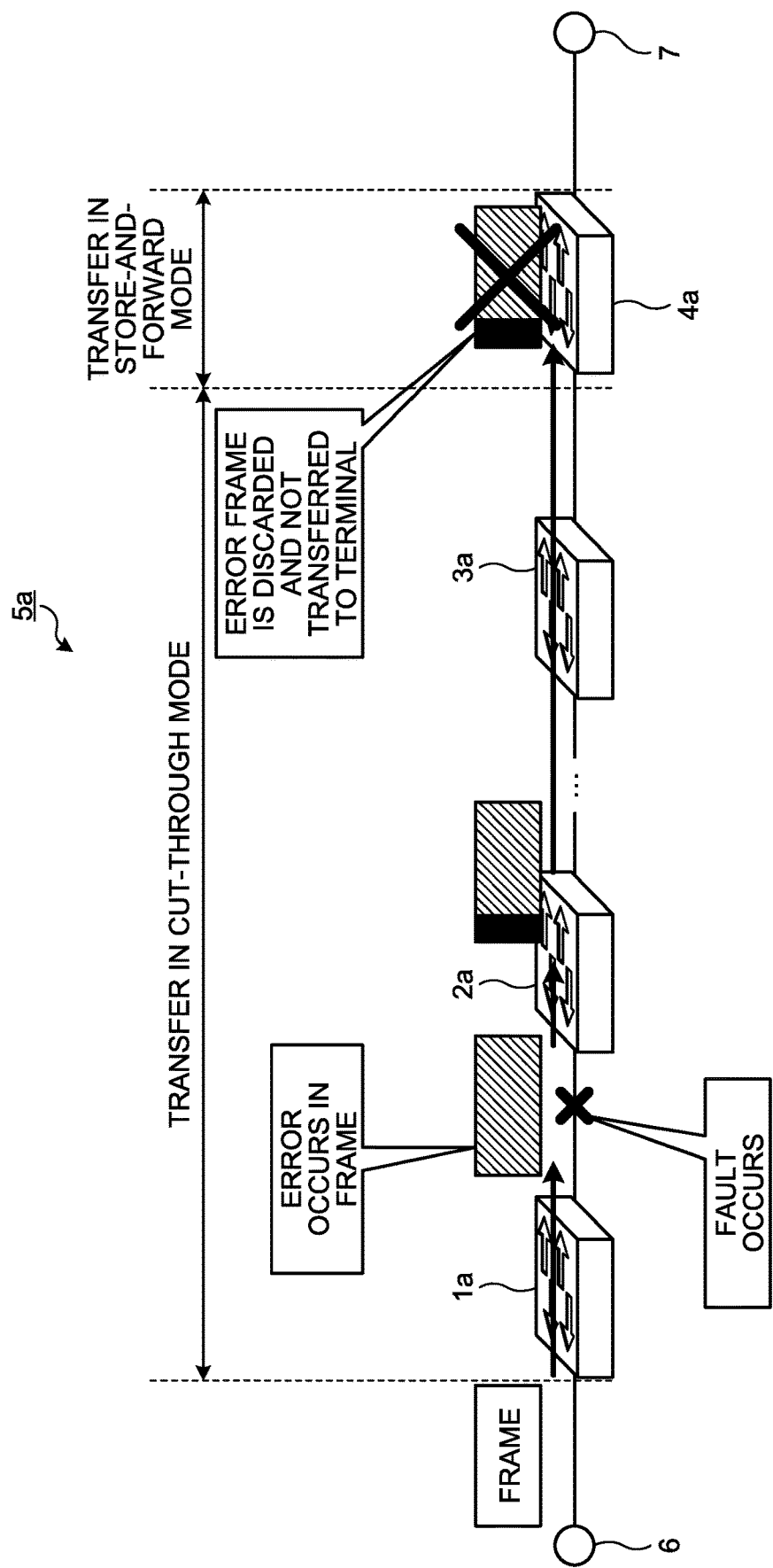
FIG. 11 is a diagram illustrating an example of a frame transfer operation of transfer devices in a case where a network according to the second embodiment includes terminals incapable of using an inverse FCS code.

FIG. 11 is a diagram illustrating an example of a frame transfer operation of the transfer devices 1a to 4a in a case where a network 5a according to the second embodiment includes terminals 6 and 7 incapable of using an inverse FCS code. In the network 5a illustrated in FIG. 11, the terminal 6 incapable of using an inverse FCS code is connected at the preceding location to the transfer device 1a and the terminal 7 incapable of using an inverse FCS code is connected at the subsequent location to the transfer device 4a. Each of the transfer devices 1a to 3a operates in the same manner as the transfer devices 1 to 3 illustrated in FIG. 6. That is, each of the transfer devices 1a to 3a transfers a frame in cut-through mode.

In a case where the terminal 7 connected at the subsequent location to the transfer device 4a is incapable of using an inverse FCS code, the transfer device 4a transfers a low-latency frame in store-and-forward mode although the low-latency frame is originally supposed to be transferred in cut-through mode. The transfer device 4a transfers a low-latency frame in store-and-forward mode. Accordingly, in a case where an error is detected in a low-latency frame intended to be transferred to the terminal 7, the transfer device 4a can prevent the low-latency frame with a detected error from being transferred to the terminal 7 and discard this low-latency frame. In the same manner as in the first embodiment, the transfer device 4a transfers a normal-latency frame in store-and-forward mode. Accordingly, in a case where an error is detected in a normal-latency frame intended to be transferred to the terminal 7, the transfer device 4a prevents the normal-latency frame with a detected error from being transferred to the terminal 7 and discards this normal-latency frame. In the manner as described above, the transfer device 4a discards a frame with a detected error and does not transfer this frame to the terminal 7.

The hardware configuration of the transfer devices 1a to 4a is implemented by the hardware configuration identical to that of the transfer devices 1 to 4.

As described above, according to the present embodiment, in a case where a device connected at the subsequent location is incapable of using an inverse FCS code explained in the first embodiment, each of the transfer devices 1a to 4a transfers even a low-latency frame in store-and-forward mode in addition to performing the functions of the first embodiment. Due to this operation, in a case where an error is detected in a low-latency frame and a normal-latency frame, the transfer devices 1a to 4a can further prevent the low-latency and normal-latency frames from being transferred and discard these frames in addition to the effects obtained in the first embodiment.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1 to 4, 1a to 4a transfer device, 5, 5a network, 6, 7 terminal, 11-1 to 11-M, 11a-1 to 11a-M input unit, 12, 12a storage unit, 13-1 to 13-M, 13a-1 to 13a-M normal-latency frame merge buffer, 14, 14a switching processing unit, 15-1 to 15-M low-latency frame output buffer, 16-1 to 16-M normal-latency frame output buffer, 17-1 to 17-M output unit, 18-1 to 18-M low-latency frame input buffer, 21 FCS code calculation unit, 22 FCS check unit, 23 inverse FCS check unit, 24, 24a error determination unit, 25, 25a frame identification unit, 31 address information, 32 priority information, 33 connected-device information, 41 output control unit, 42 FCS update unit.

The invention claimed is:
1. A transfer device comprising:
a calculation processing circuit to calculate a first code that is a frame check sequence code of a received frame;

a first comparison processing circuit to compare the first code with a second code that is a frame check sequence code stored in the received frame, and to output a first comparison result indicating a match or no match between two codes compared with each other;

a second comparison processing circuit to compare the first code with a third code obtained by inverting each bit of the second code, and to output a second comparison result indicating a match or no match between two codes compared with each other;

an error determination processing circuit to determine an error state of the received frame on a basis of the first comparison result and the second comparison result; and an update processing circuit to update, if the second comparison result indicates no match, the second code with a fourth code obtained by inverting each bit of the first code at a time when the received frame is transferred to a subsequent device.

2. The transfer device according to claim 1, wherein when the first comparison result indicates no match and the second comparison result indicates no match, the error determination processing circuit determines that a fault has occurred on a transmission path between the transfer device itself and a preceding device having outputted the received frame.

3. The transfer device according to claim 1, wherein when the first comparison result indicates no match and the second comparison result indicates a match, the error determination processing circuit determines that a fault has not occurred on a transmission path between the transfer device itself and a preceding device having outputted the received frame, but a fault has occurred at a previous transmission phase to the preceding device.

4. The transfer device according to claim 1, wherein when the transfer device comprises a plurality of input ports and output ports, the transfer device comprises the calculation processing circuit, the first comparison processing circuit, the second comparison processing circuit, and the error determination processing circuit for each of the input ports, and comprises the update processing circuit for each of the output ports.

5. The transfer device according to claim 1, comprising:
a frame identification processing circuit to determine whether the subsequent device is capable of using the third code; and
an input-side buffer circuit to store therein the received frame in order to transfer the received frame in store-and-forward mode when the subsequent device is incapable of using the third code.

6. The transfer device according to claim 5, wherein when the first comparison result indicates no match, the error determination processing circuit outputs an error signal indicating that an error has occurred in the received frame, and when the input-side buffer circuit obtains the error signal along with the received frame, the input-side buffer circuit discards the received frame.

7. The transfer device according to claim 5, wherein when the transfer device comprises a plurality of input ports, the transfer device comprises the frame identification processing circuit and the input-side buffer circuit for each of the input ports.

8. A frame transfer method comprising:
calculating a first code that is a frame check sequence code of a received frame;
comparing the first code with a second code that is a frame check sequence code stored in the received frame, and outputting a first comparison result indicating a match or no match between two codes compared with each other;
comparing the first code with a third code obtained by inverting each bit of the second code, and outputting a second comparison result indicating a match or no match between two codes compared with each other;
determining an error state of the received frame on a basis of the first comparison result and the second comparison result; and
updating, if the second comparison result indicates no match, the second code with a fourth code obtained by inverting each bit of the first code at a time when the received frame is transferred to a subsequent device.

9. A transfer device comprising:
a processor, and
a memory to store a program which, when executed by the processor, performs processes of calculating a first code that is a frame check sequence code of a received frame;
comparing the first code with a second code that is a frame check sequence code stored in the received frame, and outputting a first comparison result indicating a match or no match between two codes compared with each other;
comparing the first code with a third code obtained by inverting each bit of the second code, and outputting a second comparison result indicating a match or no match between two codes compared with each other;
determining an error state of the received frame on a basis of the first comparison result and the second comparison result; and
updating, if the second comparison result indicates no match, the second code with a fourth code obtained by inverting each bit of the first code at a time when the received frame is transferred to a subsequent device.

* * * * *